US011618440B2

(12) United States Patent
Kim et al.

(10) Patent No.: US 11,618,440 B2
(45) Date of Patent: Apr. 4, 2023

(54) METHOD FOR CONTROLLING ESA SYSTEM OF A VEHICLE AND ESA SYSTEM

(71) Applicant: Guangzhou Automobile Group Co., Ltd., Guangdong (CN)

(72) Inventors: Kilsoo Kim, Seoul (KR); Xiaoyong Wang, Sunnyvale, CA (US)

(73) Assignee: GUANGZHOU AUTOMOBILE GROUP CO., LTD., Guangzhou (CN)

( * ) Notice: Subject to any disclaimer, the term of this patent is extended or adjusted under 35 U.S.C. 154(b) by 278 days.

(21) Appl. No.: 17/092,343

(22) Filed: Nov. 9, 2020

(65) Prior Publication Data
US 2022/0144252 A1 May 12, 2022

(51) Int. Cl.
B60W 30/09 (2012.01)
G05D 1/02 (2020.01)
B60W 30/045 (2012.01)
B60W 40/072 (2012.01)
B60W 40/114 (2012.01)
B60W 10/22 (2006.01)
B60W 10/18 (2012.01)
B60W 10/119 (2012.01)
B60W 30/095 (2012.01)
B60W 10/20 (2006.01)

(52) U.S. Cl.
CPC .......... B60W 30/09 (2013.01); B60W 10/119 (2013.01); B60W 10/18 (2013.01); B60W 10/20 (2013.01); B60W 10/22 (2013.01); B60W 30/045 (2013.01); B60W 30/0956 (2013.01); B60W 40/072 (2013.01); B60W 40/114 (2013.01); G05D 1/0214 (2013.01); B60W 2510/20 (2013.01); B60W 2520/12 (2013.01); B60W 2520/14 (2013.01)

(58) Field of Classification Search
CPC .... B60W 30/09; B60W 10/119; B60W 10/18; B60W 10/20; B60W 10/22; B60W 30/045; B60W 30/0956; B60W 40/072; B60W 40/114; B60W 2510/20; B60W 2520/12; B60W 2520/14; B60W 10/00; B60W 10/04; B60W 2710/202; B60W 2710/226; B60W 2720/14; B60W 2720/40; B60W 2720/403; G05D 1/0214
See application file for complete search history.

(56) References Cited

U.S. PATENT DOCUMENTS 6,751,537 B2    6/2004   Koh
9,840,242 B2   12/2017   Bretzigheimer et al.
2005/0206234 A1*  9/2005  Tseng ................. B60W 30/045
                                              303/146
2007/0067085 A1*  3/2007  Lu ............................ B60T 8/24
                                              340/440

(Continued)

FOREIGN PATENT DOCUMENTS

CN        105813909 A    7/2016

Primary Examiner — Jason Holloway
(74) Attorney, Agent, or Firm — ScienBiziP, P.C.

(57) ABSTRACT

Provided are methods for controlling ESA system of a vehicle and an ESA system. The method includes: generating a trajectory to avoid an obstacle in front of the vehicle; obtaining a target yaw rate and yaw moment according to the trajectory; allocating the target yaw moment to one or more chassis actuators; controlling the one or more chassis actuators according to allocated yaw moments. The cooperation of actuators is implemented for more safe evasion.

18 Claims, 7 Drawing Sheets

(56) References Cited

U.S. PATENT DOCUMENTS

| | | | | |
|---|---|---|---|---|
| 2008/0275607 A1* | 11/2008 | Ammon | ............ | B60G 17/0163 |
| | | | | 701/38 |
| 2015/0224845 A1* | 8/2015 | Anderson | ............ | B60G 17/019 |
| | | | | 701/37 |
| 2017/0137023 A1* | 5/2017 | Anderson | .............. | B60G 17/02 |

\* cited by examiner

METHOD FOR CONTROLLING ESA SYSTEM OF A VEHICLE AND ESA SYSTEM

TECHNICAL FIELD

The present disclosure relates to the field of Evasive Steering Assistance (ESA) system with Integrated Chassis Control, and particularly to a method for controlling ESA system of a vehicle and an ESA system.

BACKGROUND

Currently, there have been advances on individual and integrated chassis control with not only primary actuators (engine, brake, and steer) but also with secondary actuators (active front/rear steering, active roll stabilizer, electronic damper, and all-wheel drive) for the safer, more comfortable, and agiler response of the vehicle. Among the secondary chassis actuator components the electronic damper and all-wheel drive system is more wide-spread in the market because they are less expensive and have been validated for a long time in the automotive industry.

Furthermore, there have been active and rich research and development in the advanced driving assistance system (ADAS) of automatic emergency braking (AEB), adaptive cruise control (ACC), lane keeping assist system (LKAS), emergency steering assist (ESA) with the primary actuators of engine, brake, and steering wheel with the help of advanced perception sensors and computation power.

ESA is a recent system assisting driver to evade the front objects at the emergency situation but has not widely spread of ADAS. It implemented by steering system or sometimes only cooperation with braking system using torque vectoring. But there has not been solid connection between ESA and secondary actuators.

It is to be noted that the information disclosed in this background of the disclosure is only for enhancement of understanding of the general background of the present disclosure and should not be taken as an acknowledgement or any form or suggestion that this information forms the prior art already known to a person skilled in the art.

SUMMARY

Embodiments of the present disclosure provide methods for controlling ESA system of a vehicle and an ESA system, and intend to solve the problem that there has not been solid connection between ESA and secondary actuators in related art.

According to an embodiment of the present disclosure, a method for controlling ESA system of a vehicle is provided. The method includes: generating, by a ESA of a vehicle, a trajectory to avoid an obstacle in front of the vehicle; obtaining a target yaw rate and yaw moment according to the trajectory; allocating the target yaw moment to one or more chassis actuators; controlling the one or more chassis actuators according to allocated yaw moments.

In an exemplary embodiment, wherein the step of obtaining the target yaw rate and the target yaw moment according to the trajectory comprises: calculating a lateral offset and a heading error of the vehicle according to the trajectory; obtaining a target yaw rate and yaw moment based on the following factors: the lateral velocity of the vehicle, the lateral offset of the vehicle, the heading error of the vehicle, a front steering wheel angle of the vehicle, a road curvature.

In an exemplary embodiment, wherein the step of allocating the target yaw moment to one or more chassis actuators comprises: checking whether the vehicle is at over steer or under steer based on the target yaw rate and current vehicle yaw rate; allocating the target yaw moment to the chassis actuators by the following formula:

$$M_{z,tgt}=M_{z,Driver}+M_{z,ECS}+M_{z,AWD}+M_{z,ESP}+M_{z,EPS}$$

where $M_{z,tgt}$ is the target yaw moment generated to follow the trajectory for evasion maneuver, $M_{z,Driver}$ is the yaw moment generated by driver, $M_{z,ECS}$ is the yaw moment generated by electric damper with different setting on front and rear, $M_{z,AWD}$ is yaw moment generated by all-wheel drive with different toque on front and rear, $M_{z,ESP}$ is yaw moment generated by partial braking, $M_{z,EPS}$ is yaw moment generated by electronic power steering to assist the evasive maneuver.

In an exemplary embodiment, wherein the target yaw moment is located to actuators by the following order:

$$M_{z,tgt}=M_{z,Driver} \rightarrow M_{z,ECS} \rightarrow M_{z,AWD} \rightarrow M_{z,ESP} \rightarrow M_{z,EPS}$$

In an exemplary embodiment, wherein in the case of the vehicle is under steer, the step of controlling the chassis actuators comprises at least one of the following: for ECS: output full soft damping force on front and full hard damping force on rear; for AWD: output minimum torque on front and maximum torque on rear; for ESP: output differential braking for increasing yaw rate; for EPS: output more torque.

In an exemplary embodiment, wherein in the case of the vehicle is over steer, the step of controlling the chassis actuators comprises at least one of the following: for Electronic Control Suspension (ECS): output full hard damping force on front and full soft damping force on rear; for All-Wheel Drive (AWD): output maximum torque on front and minimum torque on rear; for Electronic Stability Program (ESP): output differential braking for decreasing yaw rate; for Electric Power Steering (EPS): output less torque.

In an exemplary embodiment, wherein the chassis actuators comprise EPS and at least one of the following: ECS, AWD and ESP.

According to another embodiment of the present disclosure, an ESA system for controlling chassis actuators is provided, and the ESA system includes: generation module, configured to generate a trajectory to avoid an obstacle in front of the vehicle; obtaining module, configured to obtain a target yaw rate and yaw moment according to the trajectory; allocation module, configured to allocate the target yaw moment to one or more chassis actuators; controlling module, configured to control the one or more chassis actuators according to allocated yaw moments.

In an embodiment of the present disclosure, a non-volatile computer readable storage medium is provided, a program is stored in the non-volatile computer readable storage medium, and the program is configured to be executed by a computer to perform the steps of methods in above-mentioned embodiments.

In an embodiment of the present disclosure, a vehicle is provided. The vehicle includes the ESA system for controlling chassis actuators in above-mentioned embodiments.

Through the above-mentioned embodiments of the present disclosure, in an emergency steering event, the cooperation of actuators is implemented for more safe evasion by allocating the target yaw moment to actuators.

BRIEF DESCRIPTION OF THE DRAWINGS

The drawings described here are adopted to provide a further understanding to the present disclosure and form a part of the application. Schematic embodiments of the present disclosure and descriptions thereof are adopted to explain the present disclosure and not intended to form limits to the present disclosure. In the drawings.

DETAILED DESCRIPTION OF THE EMBODIMENTS

The present disclosure will be described below with reference to the drawings and in combination with the embodiments in detail. It is to be noted that the embodiments in the application and characteristics in the embodiments may be combined without conflicts.

Here is the foundation of the connection of ESA with the integrated chassis control of brake, electronic damper, and all-wheel drive. The present disclosure does not cover the perception and decision of ESA system but the cooperation of primary and secondary actuators for more safe evasion in the emergency steering event.

In the present embodiments, the proposed concept assumes that vehicle is equipped with the secondary chassis actuators hardware of electronic damper and all-wheel drive, so that customer can get the benefits from both individual secondary actuators and the advanced driving assistance system of ESA.

In the present embodiments, the torque vectoring system by brake does not require additional hardware installment but only needs opening control interface for making possible the individual wheel braking. The electronic damper is originally for passenger's comfort by compensating the shock from the road and now is expanded to the safer driving assistance system of ESA. The all-wheel drive system is beneficial for slippery/icy road by increasing road-holding capability and now is also extended to the safer driving assistance system of ESA.

Figure 1:
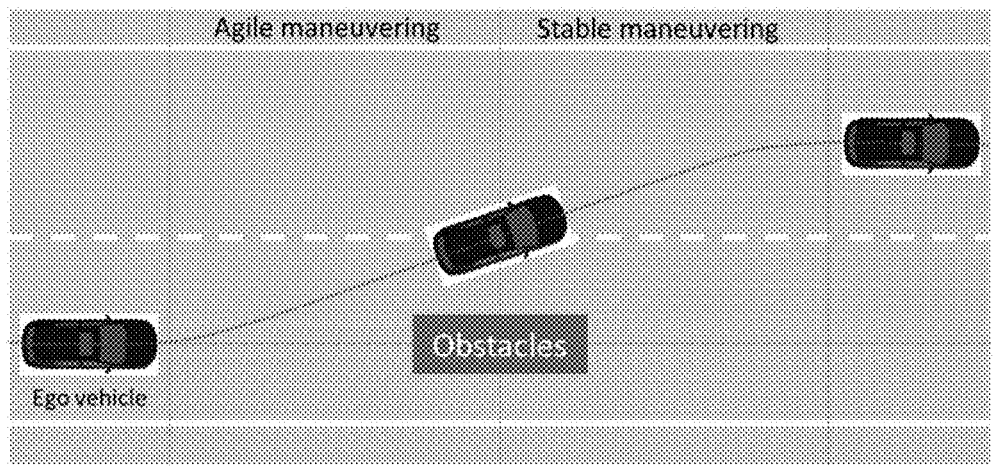
FIG. 1 shows maneuver stages at emergency steering event according to an embodiment of the present disclosure.

The emergency steering event consists of the two stages of agile and stable maneuvers shown in FIG. 1. ESA is an assistance system not fully autonomous system so that it shall be initiated by driver then it shall start to steer the vehicle and the chassis systems of brake, electronic damper, and all-wheel drive assist the emergency evasion of the front obstacles. The fundamental principles lies on generating yaw moment of vehicle so that the ego vehicle quickly evades the front obstacle and gets stabilized with the proper yaw rate. The fundamental principles of how each actuator assists the evasive motion are illustrated from FIG. 2 to FIG. 4.

Figure 2:
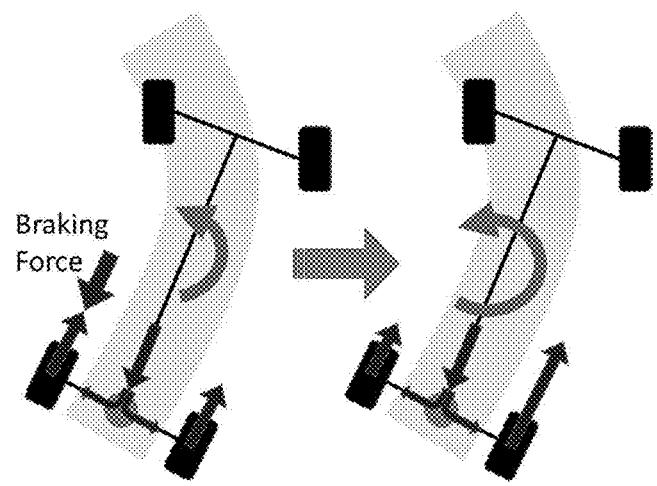
FIG. 2 shows the principle of torque vectoring by brake according to an embodiment of the present disclosure.

Herein several terms used in the present disclosure are explained as below:

1. Torque Vectoring by Brake:

The partial braking in the inner circle side generates more yaw moment so that makes vehicle turn quickly. In the emergency steering event shown in FIG. 1, the partial braking in the left side helps vehicle to evade quickly the front obstacle in the agile maneuvering stage and then the partial braking in the right wheel assist the vehicle come back to the adjacent lane in the stable maneuvering stage. FIG. 2 shows the generation of yaw moment by the partial braking in the rear wheel drive vehicle. The same principle can be also applied to the front wheel drive vehicle.

2. Electronic Damping:

The traditional damper in the vehicle has the fixed damping constant but the electronic damper has the variable damping constant c in the relation $F_{damping}=-c \cdot v$ between damping force ($F_{damping}$) and damping velocity (v). The electronic damper system has been used in improving ride quality by counteracting the roughness coming from the road. But in the field of the integrated chassis control, it has also been used in improving handling quality with the following fundamental principle embedded in the relation between the lateral and vertical tire forces.

Figure 3:
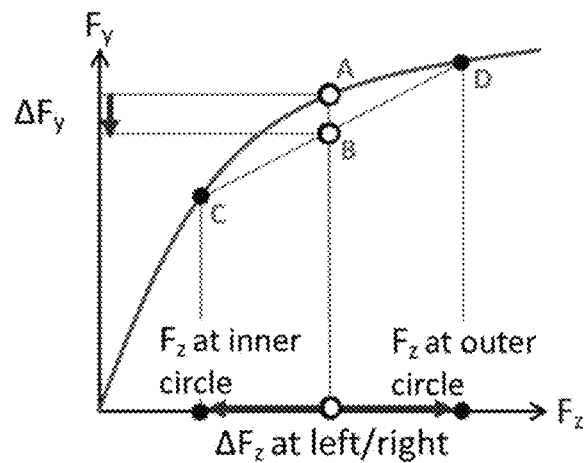
FIG. 3 shows the principle of electronic damper according to an embodiment of the present disclosure.
Figure 4:
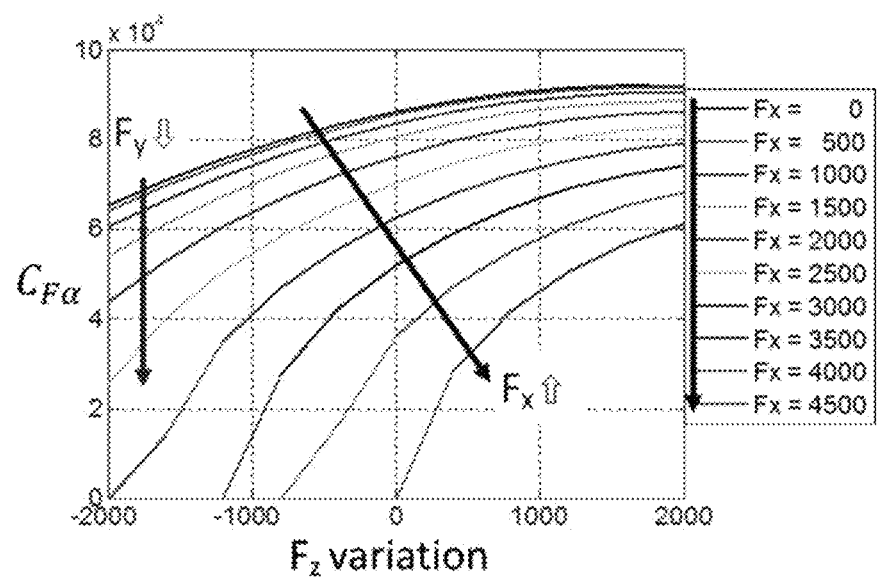
FIG. 4 shows the principle of all-wheel drive according to an embodiment of the present disclosure.

As shown in FIG. 3, the relation of lateral tire force (Fy) with the vertical tire force (Fz) is nonlinear. Due to this nonlinearity, when the lateral load transfer in the left/right sides is $\Delta F_z$ in turning the resulting reduction of lateral axial tire is $\Delta F_y$ which is the difference between A and B. The variation of $\Delta F_z$ is controlled by the electronic damper: If the damping coefficient at front is bigger than that at the rear then the $\Delta F_z$ is bigger at the front than at the rear so that the lateral axial tire force reduction at the front is bigger than at the rear. This leads to $F_{y,front}<F_{y,rear}$ so that it generates the less yaw moment in the direction of turn. In the reverse case when the damping coefficient at the front is smaller than that at the rear $F_{y,front}>F_{y,rear}$, which leads to generating more yaw moment in the direction of turn. This explanation is summarized at table 1. Table 1 is the relation of damping force variation and yaw moment.

TABLE 1

| | Front | Rear | Fz variation | Fy variation | Yaw moment |
|---|---|---|---|---|---|
| Damper Setting | Hard | Soft | $\Delta F_{z,front} > \Delta F_{z,rear}$ | $\Delta F_{y,front} < \Delta F_{y,rear}$ | $M_z \downarrow$ |
| | Soft | Hard | $\Delta F_{z,front} < \Delta F_{z,rear}$ | $\Delta F_{y,front} > \Delta F_{y,rear}$ | $M_z \uparrow$ |

3. All-Wheel Drive:

The lateral and longitudinal tire forces ($F_x, F_y$) are limited by the friction circle with the vertical tire force ($F_z$) and the friction coefficient ($\mu$), $$\sqrt{F_x^2 + F_y^2} \leq \mu F_z.$$

When the more driving torque is delivered to the front wheel then the more longitudinal tire force at the front does not give more room for lateral tire force at the front so that the resulting yaw moment is smaller than the reverse case.

Figure 5:
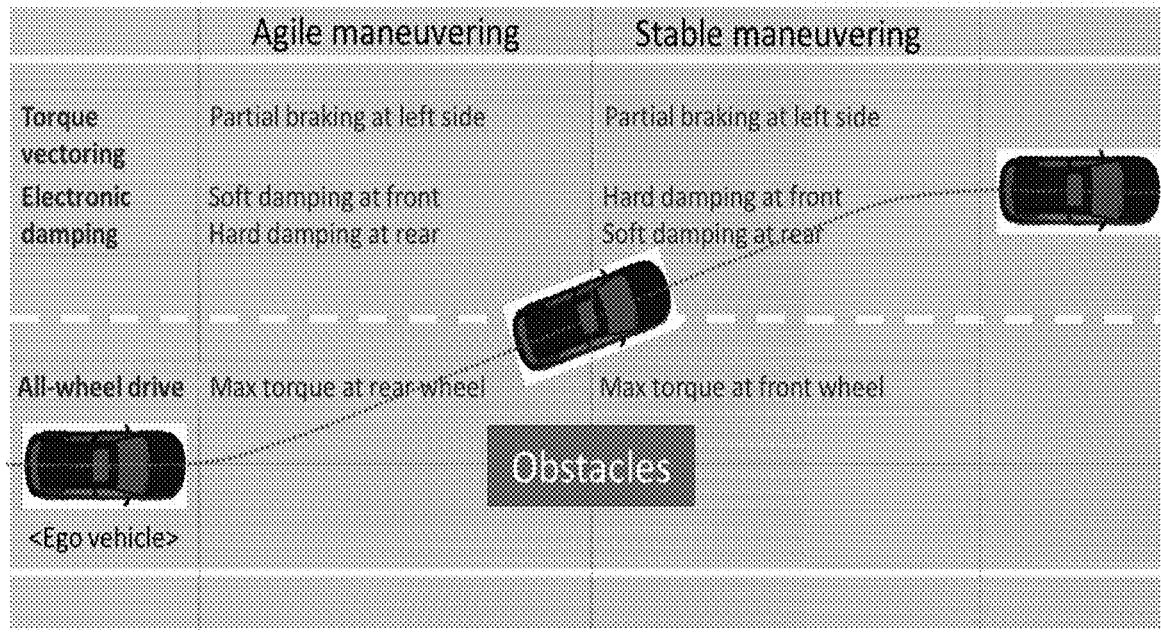
FIG. 5 shows control strategy of each actuator at ESA according to an embodiment of the present disclosure.

The control strategy of each actuator for the ESA follows with the illustration shown in table 2 and FIG. 5. Table 2 is the control strategy at emergency steering event.

TABLE 2

| | Actuators | Agile maneuvering | Stable maneuvering |
|---|---|---|---|
| Control Strategy | Torque vectoring Electronic damping All-wheel drive | Partial braking at inner circle Soft damping at front Hard damping at rear Max torque at rear wheel | Partial braking at inner circle Hard damping at front Soft damping at rear Max torque at front wheel |

Embodiment 1

Figure 6:
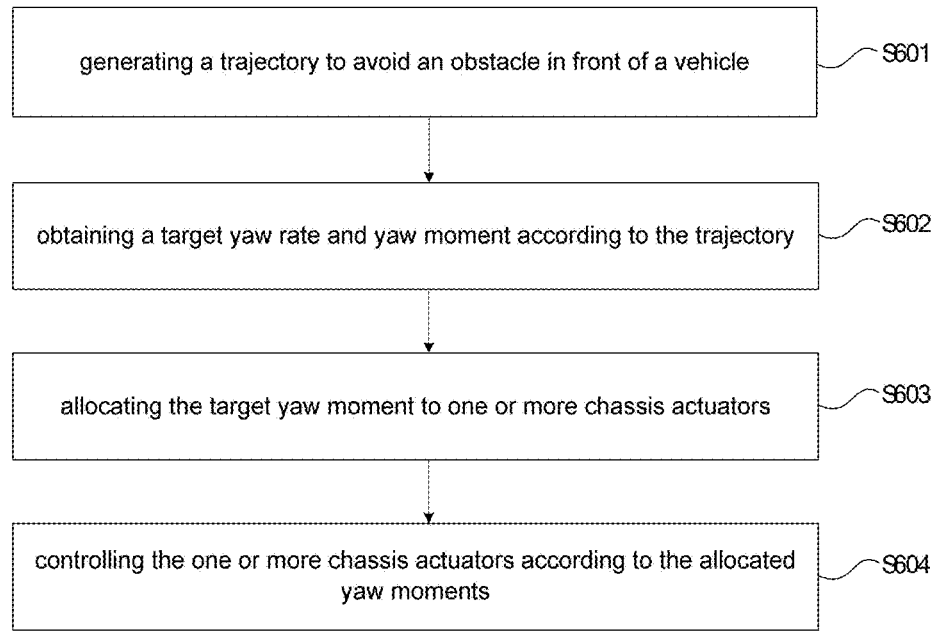
FIG. 6 is a flowchart of a method for controlling ESA system according to an embodiment of the present disclosure.

In the present embodiment, a method for controlling the ESA system of a vehicle is provided. As shown in FIG. 6, the method includes the following steps.

At S601, generating a trajectory to avoid an obstacle in front of the vehicle;

At S602, obtaining a target yaw rate and yaw moment according to the trajectory;

At S603, allocating the target yaw moment to chassis actuators;

At S604, controlling the chassis actuators based on the allocated yaw moments.

In the present embodiment, the step of S602 may include: calculating a lateral offset and a heading error of the vehicle according to the trajectory; obtaining a target yaw rate and yaw moment based on the following factors: the lateral velocity of the vehicle, the lateral offset of the vehicle, the heading error of the vehicle, a front steering wheel angle of the vehicle, a road curvature.

In the present embodiment, the step of S603 may include: checking whether the vehicle is at over steer or under steer based on the target yaw rate and current vehicle yaw rate; allocating the target yaw moment to the chassis actuators by the following formula:

$$M_{z,tgt}=M_{z,Driver}+M_{z,ECS}+M_{z,AWD}+M_{z,ESP}+M_{z,EPS}$$

where $M_{z,tgt}$ is the target yaw moment generated to follow the trajectory for evasion maneuver, $M_{z,Driver}$ is the yaw moment generated by driver, $M_{z,ECS}$ is the yaw moment generated by electric damper with different setting on front and rear, $M_{z,AWD}$ is yaw moment generated by all-wheel drive with different toque on front and rear, $M_{z,ESP}$ is yaw moment generated by partial braking, $M_{z,EPS}$ is yaw moment generated by electronic power steering to assist the evasive maneuver.

In the step of S603 of the present embodiment, wherein the target yaw moment is located to actuators by the following order:

$$M_{z,tgt}=M_{z,Driver} \to M_{z,ECS} \to M_{z,AWD} \to M_{z,ESP} \to M_{z,EPS}$$

In the present embodiment, in the case of the vehicle is under steer, the step of S604 may include at least one of the following: for ECS: output full soft damping force on front and full hard damping force on rear; for AWD: output minimum torque on front and maximum torque on rear; for ESP: output differential braking for increasing yaw rate; for EPS: output more torque.

In the present embodiment, in the case of the vehicle is over steer, the step of S604 may include at least one of the following: for ECS: output full hard damping force on front and full soft damping force on rear; for AWD: output maximum torque on front and minimum torque on rear; for ESP: output differential braking for decreasing yaw rate; for EPS: output less torque.

In the present embodiment, wherein the chassis actuators may include EPS and at least one of the following: ECS, AWD and ESP.

Embodiment 2

Figure 7:
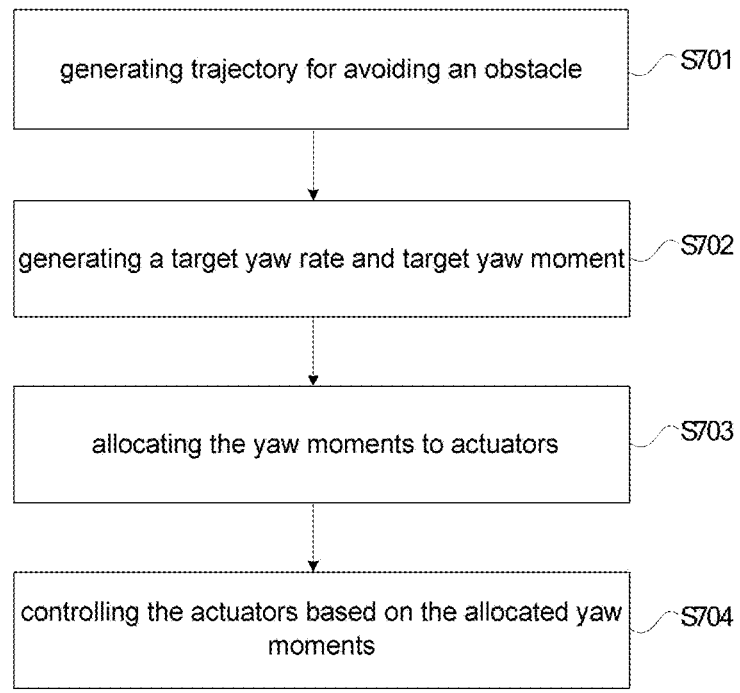
FIG. 7 is a flowchart of a method for controlling ESA system according to another embodiment of the present disclosure.

In the present embodiment, a method for controlling the ESA system of a vehicle is provided. As shown in FIG. 7, the method includes the following steps.

At S701, generating trajectory for avoiding an obstacle.

In the present embodiment, before the step S701, the ESA need to be initiated by the driver. The perception and decision is very important in the evasive maneuvering but they are not in the scope in the present embodiment. It is assumed that the perfect information comes from the perception and decision modules.

Figure 8:
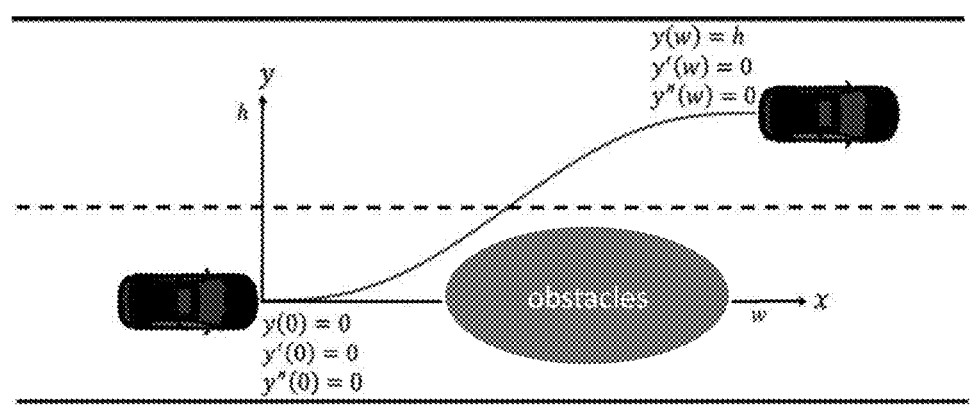
FIG. 8 is a schematic diagram of trajectory generation of evasive maneuvering according to an embodiment of the present disclosure.

FIG. 8 is a trajectory generation of evasive maneuvering, as shown in FIG. 8, a trajectory is generated to avoid the obstacles in front of the host vehicle with the help of perception which is not in the scope of this disclosure.

$$y(t)=a_5t^5+a_4t^4+a_3t^3+a_2t^2+a_1t+a_0$$

with the six boundary conditions at $$y|_{t=0}=0, y|_{t=t_m}=h$$

$$\dot{y}|_{t=0}=0, \dot{y}|_{t=t_m}=0$$

$$\ddot{y}|_{t=0}=0, \ddot{y}|_{t=t_m}=0$$

It results in $$a_5 = \frac{6h}{t_m^5}, a_4 = -\frac{15h}{t_m^4}, a_3 = \frac{10h}{t_m^3},$$

and $a_2=a_1=a_0=0$. From the trajectory generated, the lateral offset ($e_1$), its derivative, and heading error ($e_2$), and its derivative can be calculated:

$$e_1 = y(t) = a_5t^5 + a_4t^4 + a_3t^3,$$

$$\dot{e}_1 = \dot{y}(t) = 5a_5t^4 + 4a_4t^3 + 3a_3t^2,$$

$$e_2 = \operatorname{atan}(y'(t)) = \operatorname{atan}(\dot{y}(t)/V_x)$$

$$\dot{e}_2 = \frac{d}{dt}\operatorname{atan}(y'(t)) = \frac{\partial}{\partial x}\operatorname{atan}(y'(t))\frac{\partial x}{\partial t} = \frac{y''(x)}{1+y'^2(x)}V_x$$

At S702, generating a target yaw rate and target yaw moment.

From the target trajectory, the desired target yaw rate ($r_{tgt}$) and yaw moment ($M_{z,tgt}$) can be obtained in the following manner:

$$r_{tgt}=\dot{e}_2$$

$$M_{z,tgt}=I_z\ddot{e}_2$$

The state space system model consists of states from both inertial and vision:

$$\dot{\Sigma}=A\Sigma+B\delta_f+DM_{z,tgt}+E\kappa$$

$$\sum = [V_y, r, e_y, e_\psi]^T$$

$$\frac{d}{dt}\begin{Bmatrix} V_y \\ r \\ e_y \\ e_\psi \end{Bmatrix} =$$

$$\underbrace{\begin{bmatrix} a_{11} & a_{12} & 0 & 0 \\ a_{21} & a_{22} & 0 & 0 \\ 1 & 0 & 0 & V_x \\ 0 & 1 & 0 & 0 \end{bmatrix}}_{A}\begin{Bmatrix} V_y \\ r \\ e_y \\ e_\psi \end{Bmatrix} + \begin{bmatrix} 2C_f/m \\ 2l_f C_f/I_z \\ 0 \\ 0 \end{bmatrix}\delta_f + \begin{bmatrix} 0 \\ 1/I_z \\ 0 \\ 0 \end{bmatrix}M_{z,tgt} + \underbrace{\begin{bmatrix} 0 \\ 0 \\ -V_x \\ 0 \end{bmatrix}}_{E}\kappa$$

where $V_y$ is lateral velocity of vehicle, r is yaw rate, $e_y$ is lateral offset, $e_\psi$ is heading error, $\delta_f$ is front steering wheel angle, $\kappa$ is road curvature, $M_z$ is yaw moment, and $$a_{11} = \frac{-2}{mV_x}(C_f + C_r), a_{12} = -1 + \frac{2(-l_f C_f + l_r C_r)}{mV_x},$$

$$a_{21} = \frac{2}{I_z V_x}(-l_f C_f + l_r C_r), a_{22} = \frac{-2}{I_z V_x}(l_f^2 C_f + l_r^2 C_r).$$

At S703, allocating the yaw moments to actuators.

Based on the yaw moment induced by driver, the target yaw moment needs to be allocated to the actuators to complete the evasive maneuver $$M_{z,tgt} = M_{z,Driver} + M_{z,ECS} + M_{z,AWD} + M_{z,ESP} + M_{z,EPS}$$

where $M_{z,tgt}$ is the target yaw moment generated to follow the trajectory for evasion maneuver; $M_{z,Driver}$ is the yaw moment by driver; $M_{z,ECS}$ is the yaw moment by electric damper with different setting on front and rear; $M_{z,AWD}$ is yaw moment by all-wheel drive with different toque on front and rear; $M_{z,ESP}$ is yaw moment by partial braking, which generates the yaw rate of 2-3 deg/sec which is tunable; $M_{z,EPS}$ is yaw moment by electronic power steering to assist the evasive maneuver.

Figure 9:
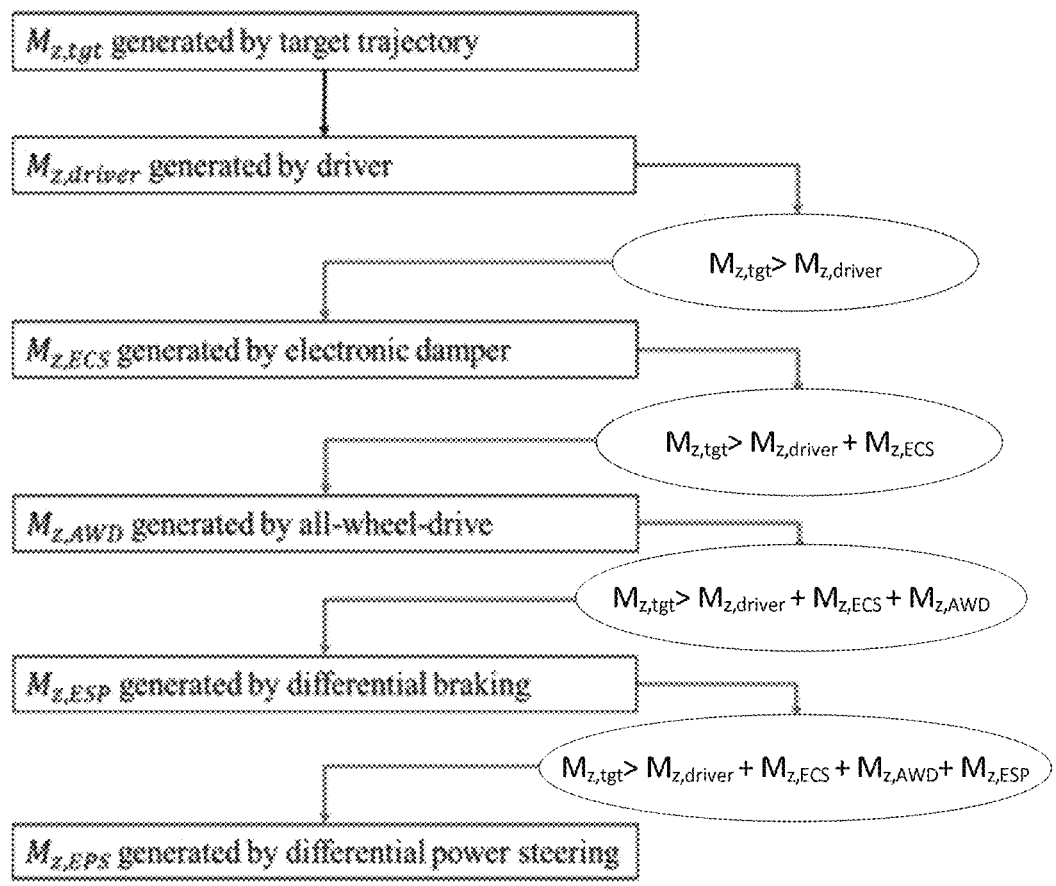
FIG. 9 is a schematic diagram of target yaw moment allocation according to an embodiment of the present disclosure.

In the present embodiment, as shown in FIG. 9, the allocation order follows:

$$M_{z,tgt} = M_{z,Driver} \rightarrow M_{z,ECS} \rightarrow M_{z,AWD} \rightarrow M_{z,ESP} \rightarrow M_{z,EPS}$$

Figure 10:
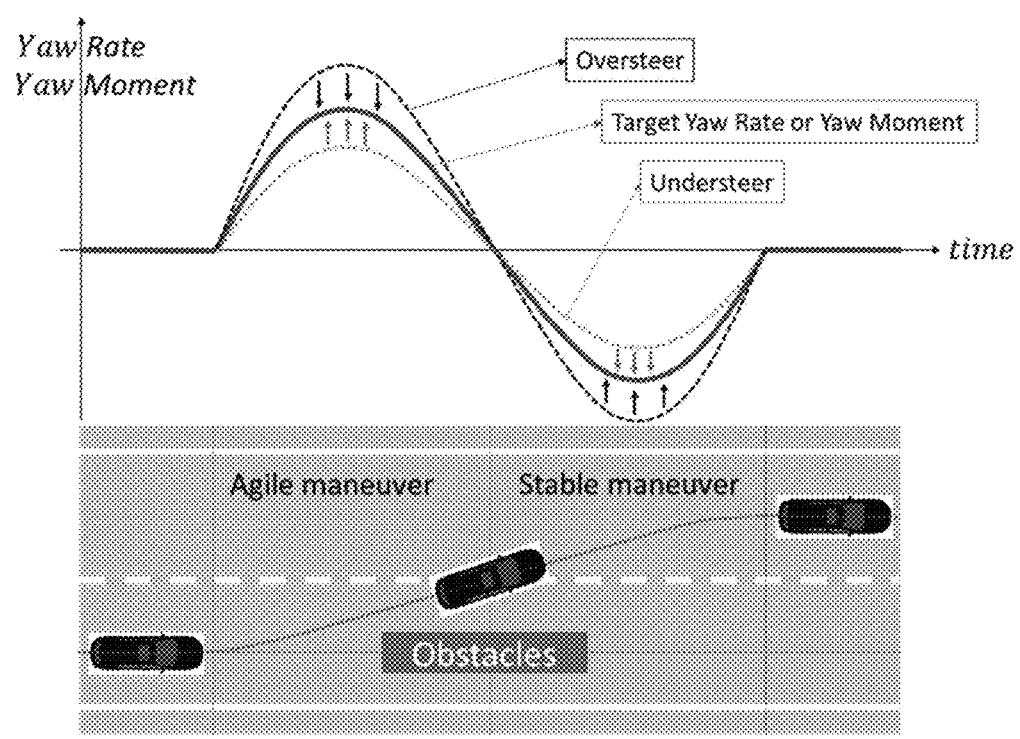
FIG. 10 is a schematic diagram of under/over steer at evasive maneuvering according to an embodiment of the present disclosure.

As shown in FIG. 10, first check whether the vehicle is at over steer or under steer based on the target yaw rate and vehicle yaw rate by driver then the remaining yaw moment $M_{z,tgt} - M_{z,Driver}$ will be allocated to actuators in the order above.

At S704, controlling the actuators based on the allocated yaw moments.

Based on the check of over/under steer, the actuators are controlled as table 3:

TABLE 3

| | ECS | AWD | ESP | EPS |
|---|---|---|---|---|
| Under Steer | Full Soft on front Full Hard on rear | Min torque on front Max torque on rear | Differential braking for increasing yaw rate | More torque |
| Over Steer | Full Hard on front Full Soft on rear | Max torque on front Min torque on rear | Differential braking for decreasing yaw rate | Less torque |

In practice, the yaw moments generated from ECS and AWD is not large in comparison to yaw moments generated from ESP and EPS. That is why full soft/hard damping force and max/min torque are applied to ECS and AWD, respectively. And then ESP and EPS take care the required remaining yaw moment which is $M_{z,tgt} - (M_{z,Driver} + M_{z,ECS} + M_{z,AWD})$. In ESP and EPS, two much partial braking and steering torque irrigate driver so it is restricted that ESP generates about 2-3 degree/sec of the required yaw rate and EPS takes care of the remaining required yaw rate and moment.

Note that the present embodiment may include the possible combination of actuators as shown in table 4. It covers every combination of actuators from EPS only system to all the combined actuators according to target yaw moment allocation shown at FIG. 7.

TABLE 4

| | 3 + EPS | 2 + EPS | 1 + EPS | EPS only |
|---|---|---|---|---|
| 8 cases of combination | ECS/AWD/ ESP + EPS | ECS/AWD + EPS ECS/ESP + EPS AWD/ESP + EPS | ECS + EPS AWD + EPS ESP + EPS | EPS |

Embodiment 4

In the embodiment, an ESA system for controlling chassis actuators is provided. The ESA is configured to implement the abovementioned embodiments with preferred implementation modes. What has been described will not be elaborated. For example, term "module", used below, may be a combination of software and/or hardware realizing a predetermined function. Although the device described in the following embodiment is preferably implemented by the software, implementation by the hardware or the combination of the software and the hardware is also possible and conceivable.

FIG. 10 is a structure block diagram of an ESA system for controlling chassis actuators according to an embodiment of the present disclosure. As shown in FIG. 10, the ESA system 100 includes a generation module 10, an obtaining module 20, an allocation module 30 and a controlling module 40.

The generation module 10 is configured to generate a trajectory to avoid an obstacle in front of the vehicle.

The obtaining module 20 is configured to obtain a target yaw rate and yaw moment according to the trajectory.

The allocation module 30 is configured to allocate the target yaw moment to one or more chassis actuators.

The controlling module 40 is configured to control the one or more chassis actuators according to allocated yaw moments.

Embodiment 4

According to the present embodiment, a non-volatile computer readable storage medium is provided, a program is stored in the non-volatile computer readable storage medium, and the program is configured to be executed by a computer to perform the following steps.

At S1, generating a trajectory to avoid an obstacle in front of a vehicle;

At S2, obtaining a target yaw rate and yaw moment according to the trajectory;

At S3, allocating the target yaw moment to one or more chassis actuators;

At S4, controlling the one or more chassis actuators according to the allocated yaw moments.

In an embodiment, the storage medium in the embodiment may include, but not limited to, various medium capable of storing computer programs such as a U disk, a ROM, a RAM, a mobile hard disk, a magnetic disk or an optical disk.

Embodiment 5

Figure 11:
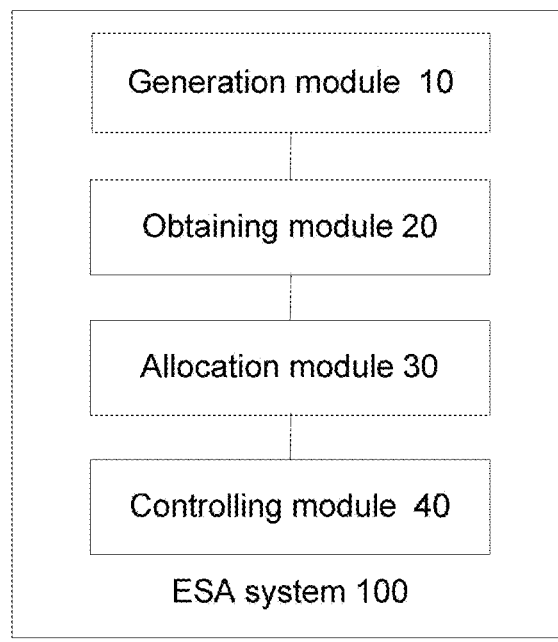
FIG. 11 is a structure block diagram of an ESA system according to another embodiment of the present disclosure.
Figure 12:
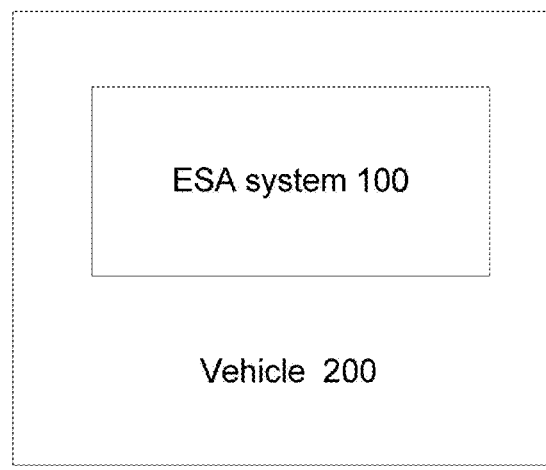
FIG. 12 is a structure block diagram of a vehicle according to an embodiment of the present disclosure.

According to the present embodiment, a vehicle is provided. As shown in FIG. 11, the vehicle 200 includes the ESA system in above-mentioned embodiments. It is to be noted that in the present embodiment the vehicle can be different kinds of vehicles.

It is apparent that those skilled in the art should know that each module or each step of the present disclosure may be implemented by a universal computing device, and the modules or steps may be concentrated on a single computing device or distributed on a network formed by a plurality of computing devices, and may in an embodiment be implemented by program codes executable for the computing devices, so that the modules or the steps may be stored in a storage device for execution with the computing devices, the shown or described steps may be executed in sequences different from those described here in some circumstances, or may form individual integrated circuit module respectively, or multiple modules or steps therein may form a single integrated circuit module for implementation. Therefore, the present disclosure is not limited to any specific hardware and software combination.

The above is only the exemplary embodiments of the present disclosure and not intended to limit the present disclosure. For those skilled in the art, the present disclosure may have various modifications and variations. Any modifications, equivalent replacements, improvements and the like made within the spirit and principle of the present disclosure shall fall within the scope of protection of the present disclosure.

What is claimed is:

1. A method for controlling Evasive Steering Assistance (ESA) of a vehicle, comprising:
   generating a trajectory to avoid an obstacle in front of the vehicle;
   obtaining a target yaw rate and a target yaw moment according to the trajectory;
   allocating the target yaw moment to one or more chassis actuators of the vehicle, comprising:
     checking whether the vehicle is at over steer or under steer based on the target yaw rate and a current vehicle yaw rate;
     allocating the target yaw moment to the one or more chassis actuators by the following formula:

$$M_{z,tgt}=M_{z,Driver}+M_{z,ECS}+M_{z,AWD}+M_{z,ESP}+M_{z,EPS}$$

where $M_{z,tgt}$ is the target yaw moment generated to follow the trajectory for evasion maneuver, $M_{z,Driver}$ is a yaw moment generated by driver, $M_{z,ECS}$ is a yaw generated by electric damper with different setting on front and rear, $M_{z,AWD}$ is a yaw moment generated by all-wheel drive with different torque on front and rear, $M_{z,ESP}$ is a yaw moment generated by partial braking, $M_{z,EPS}$ is a yaw moment generated by electronic power steering to assist the evasive maneuver;

controlling the one or more chassis actuators according to allocated yaw moments.

2. The method as claimed in claim 1, wherein the step of obtaining the target yaw rate and the target yaw moment according to the trajectory comprises:
   calculating a lateral offset and a heading error of the vehicle according to the trajectory;
   obtaining the target yaw rate and the target yaw moment based on the following factors: the lateral velocity of the vehicle, the lateral offset of the vehicle, the heading error of the vehicle, a front steering wheel angle of the vehicle, a road curvature.

3. The method as claimed in claim 1, wherein the target yaw moment is located to actuators by the following order:

$$M_{z,tgt}=M_{z,Driver}\rightarrow M_{z,ECS}\rightarrow M_{z,AWD}\rightarrow M_{z,ESP}\rightarrow M_{z,EPS}.$$

4. The method as claimed in claim 1, wherein in response that the vehicle is under steer, controlling the chassis actuators comprises at least one of the following:
   for Electronic Control Suspension (ECS): output full soft damping force on front and full hard damping force on rear;
   for All-Wheel Drive (AWD): output minimum torque on front and maximum torque on rear;
   for Electronic Stability Program (ESP): output differential braking for increasing yaw rate;
   for Electric Power Steering (EPS): output more torque.

5. The method as claimed in claim 1, wherein in response that the vehicle is over steer, controlling the chassis actuators comprises at least one of the following:
   for Electronic Control Suspension (ECS): output full hard damping force on front and full soft damping force on rear;
   for All-Wheel Drive (AWD): output maximum torque on front and minimum torque on rear;
   for Electronic Stability Program (ESP): output differential braking for decreasing yaw rate;
   for Electric Power Steering (EPS): output less torque.

6. The method as claimed in claim 1, wherein the one or more chassis actuators comprise EPS and at least one of the following: Electronic Control Suspension (ECS), All-Wheel Drive (AWD), Electronic Stability Program (ESP) and Electric Power Steering (EPS).

7. A non-transitory computer readable storage medium, in which a program is stored, the program is configured to be executed by a computer to perform a method for controlling Evasive Steering Assistance (ESA) of a vehicle, the method comprising:
   generating a trajectory to avoid an obstacle in front of the vehicle;
   obtaining a target yaw rate and a target yaw moment according to the trajectory;
   allocating the target yaw moment to one or more chassis actuators of the vehicle, comprising:
     checking whether the vehicle is at over steer or under steer based on the target yaw rate and a current vehicle yaw rate;
     allocating the target yaw moment to the one or more chassis actuators by the following formula:

$$M_{z,tgt}=M_{z,Driver}+M_{z,ECS}+M_{z,AWD}+M_{z,ESP}+M_{z,EPS}$$

where $M_{z,tgt}$ is the target yaw moment generated to follow the trajectory for evasion maneuver, $M_{z,Driver}$ is a yaw moment generated by driver, $M_{z,ECS}$ is a yaw moment generated by electric damper with different setting on front and rear, $M_{z,AWD}$ is a yaw moment generated by all-wheel drive with different torque on front and rear, $M_{z,ESP}$ is a yaw moment generated by partial braking, $M_{z,EPS}$ is a yaw moment generated by electronic power steering to assist the evasive maneuver;

controlling the one or more chassis actuators according to allocated yaw moments.

8. The non-transitory storage medium of claim 7, wherein obtaining the target yaw rate and the target yaw moment according to the trajectory comprises:

calculating a lateral offset and a heading error of the vehicle according to the trajectory;

obtaining the target yaw rate and the target yaw moment based on the following factors: the lateral velocity of the vehicle, the lateral offset of the vehicle, the heading error of the vehicle, a front steering wheel angle of the vehicle, a road curvature.

9. The non-transitory storage medium of claim 7, wherein the target yaw moment is located to actuators by the following order:

$$M_{z,tgt}=M_{z,Driver} \to M_{z,ECS} \to M_{z,AWD} \to M_{z,ESP} \to M_{z,EPS}.$$

10. The non-transitory storage medium of claim 7, wherein in response that the vehicle is under steer, controlling the chassis actuators comprises at least one of the following:

for Electronic Control Suspension (ECS): output full soft damping force on front and full hard damping force on rear;

for All-Wheel Drive (AWD): output minimum torque on front and maximum torque on rear;

for Electronic Stability Program (ESP): output differential braking for increasing yaw rate;

for Electric Power Steering (EPS): output more torque.

11. The non-transitory storage medium of claim 7, wherein in response that the vehicle is over steer, controlling the chassis actuators comprises at least one of the following:

for Electronic Control Suspension (ECS): output full hard damping force on front and full soft damping force on rear;

for All-Wheel Drive (AWD): output maximum torque on front and minimum torque on rear;

for Electronic Stability Program (ESP): output differential braking for decreasing yaw rate;

for Electric Power Steering (EPS): output less torque.

12. The non-transitory storage medium of claim 7, wherein the one or more chassis actuators comprise EPS and at least one of the following: Electronic Control Suspension (ECS), All-Wheel Drive (AWD), Electronic Stability Program (ESP) and Electric Power Steering (EPS).

13. A vehicle, comprising:

a computer readable storage medium, which storing a program, when the program is executed by a computer, cause the computer to perform a method for controlling Evasive Steering Assistance (ESA) of the vehicle, the method comprising:

generating a trajectory to avoid an obstacle in front of the vehicle;

obtaining a target yaw rate and a target yaw moment according to the trajectory;

allocating the target yaw moment to one or more chassis actuators of the vehicle, comprising:

checking whether the vehicle is at over steer or under steer based on the target yaw rate and a current vehicle yaw rate;

allocating the target yaw moment to the one or more chassis actuators by the following formula:

$$M_{z,tgt}=M_{z,Driver}+M_{z,ECS}+M_{z,AWD}+M_{z,ESP}+M_{z,EPS}$$

where $M_{z,tgt}$ is the target yaw moment generated to follow the trajectory for evasion maneuver, $M_{z,Driver}$ is a yaw moment generated by driver, $M_{z,ECS}$ is a yaw moment generated by electric damper with different setting on front and rear, $M_{z,AWD}$ is a yaw moment generated by all-wheel drive with different torque on front and rear, $M_{z,ESP}$ is a yaw moment generated by partial braking, $M_{z,EPS}$ is a yaw moment generated by electronic power steering to assist the evasive maneuver;

controlling the one or more chassis actuators according to allocated yaw moments.

14. The vehicle of claim 13, wherein obtaining the target yaw rate and the target yaw moment according to the trajectory comprises:

calculating a lateral offset and a heading error of the vehicle according to the trajectory;

obtaining the target yaw rate and the target yaw moment based on the following factors: the lateral velocity of the vehicle, the lateral offset of the vehicle, the heading error of the vehicle, a front steering wheel angle of the vehicle, a road curvature.

15. The vehicle of claim 13, wherein the target yaw moment is located to actuators by the following order:

$$M_{z,tgt}=M_{z,Driver} \to M_{z,ECS} \to M_{z,AWD} \to M_{z,ESP} \to M_{z,EPS}.$$

16. The vehicle of claim 13, wherein in response that the vehicle is under steer, controlling the chassis actuators comprises at least one of the following:

for Electronic Control Suspension (ECS): output full soft damping force on front and full hard damping force on rear;

for All-Wheel Drive (AWD): output minimum torque on front and maximum torque on rear;

for Electronic Stability Program (ESP): output differential braking for increasing yaw rate;

for Electric Power Steering (EPS): output more torque.

17. The vehicle of claim 13, wherein in response that the vehicle is over steer, controlling the chassis actuators comprises at least one of the following:

for Electronic Control Suspension (ECS): output full hard damping force on front and full soft damping force on rear;

for All-Wheel Drive (AWD): output maximum torque on front and minimum torque on rear;

for Electronic Stability Program (ESP): output differential braking for decreasing yaw rate;

for Electric Power Steering (EPS): output less torque.

18. The vehicle of claim 13, wherein the one or more chassis actuators comprise EPS and at least one of the following: Electronic Control Suspension (ECS), All-Wheel Drive (AWD), Electronic Stability Program (ESP) and Electric Power Steering (EPS).

* * * * *